United States Patent
Porter et al.

(10) Patent No.: US 6,803,113 B2
(45) Date of Patent: Oct. 12, 2004

(54) HIGH BARRIER ANTIFOG LAMINATE FOR CASE READY MEAT PACKAGING

(75) Inventors: Simon J. Porter, Allentown, PA (US); Jeffrey D. Moulton, Morristown, NJ (US); Yuan-Ping Robert Ting, Plainsboro, NJ (US)

(73) Assignee: Honeywell International Inc., Morristown, NJ (US)

( * ) Notice: Subject to any disclaimer, the term of this patent is extended or adjusted under 35 U.S.C. 154(b) by 68 days.

(21) Appl. No.: 10/174,775

(22) Filed: Sep. 13, 2002

(65) Prior Publication Data

US 2004/0053063 A1 Mar. 18, 2004

(51) Int. Cl.⁷ ......................... B32B 27/00; B32B 27/34; B32B 27/08
(52) U.S. Cl. ................. 428/474.4; 428/34.1; 428/34.8; 428/34.9; 428/34.6; 428/35.2; 428/35.7; 428/213; 428/474.7; 428/474.9; 156/78; 156/229; 383/109; 383/113; 426/106; 264/176.1; 264/173.19
(58) Field of Search .............................. 428/34.8, 34.1, 428/34.9, 34.6, 474.7, 35.2, 474.4, 474.9, 35.7, 213; 156/78, 229; 383/109, 113; 426/106; 264/176.1, 173.19

(56) References Cited

U.S. PATENT DOCUMENTS

| 5,069,953 A | * | 12/1991 | Kishikawa et al. | ......... 428/201 |
|---|---|---|---|---|
| 5,520,764 A | | 5/1996 | Toney et al. | ............. 156/244.1 |
| 5,567,533 A | | 10/1996 | Toney et al. | ............. 428/475.5 |
| 5,766,772 A | | 6/1998 | Ciocca et al. | ................ 428/516 |
| 5,919,547 A | | 7/1999 | Kocher et al. | .............. 428/138 |
| 6,346,285 B1 | * | 2/2002 | Ramesh | ....................... 426/105 |
| 6,500,559 B2 | * | 12/2002 | Hofmeister et al. | ...... 428/474.4 |
| 6,562,443 B1 | * | 5/2003 | Espinel et al. | .............. 428/213 |
| 6,565,936 B1 | * | 5/2003 | Peiffer et al. | .............. 428/35.9 |
| 6,627,273 B2 | * | 9/2003 | Wolf et al. | ................ 428/34.9 |
| 2003/0148123 A1 | * | 8/2003 | Musco et al. | ............ 428/474.4 |
| 2003/0170409 A1 | * | 9/2003 | Porter et al. | ............... 428/34.9 |

FOREIGN PATENT DOCUMENTS

WO     WO 01/89830     11/2001

* cited by examiner

Primary Examiner—P. Hampton Hightower
(74) Attorney, Agent, or Firm—Virginia Szigeti

(57) ABSTRACT

A multilayered packaging film having good antifog performance that is suitable for use in food packaging. The multilayered film comprises an outer film attached to an inner film, which outer film is a combination of a first nylon layer, an ethylene vinyl alcohol layer attached to a surface of the first nylon layer and a second nylon layer attached to the ethylene vinyl alcohol layer. The inner film is a combination of a third nylon layer having a silicone oil on a first surface of the third nylon layer, and a sealant film on a second surface of the third nylon layer, attached either directly or via an intermediate adhesive layer. An antifog composition is either contained within the sealant film or is coated on a surface of the sealant film opposite the third nylon layer. The silicone oil effectively blocks the migration of the antifog composition into an adjacent nylon layer when the multilayered film is stored in roll form.

53 Claims, No Drawings

HIGH BARRIER ANTIFOG LAMINATE FOR CASE READY MEAT PACKAGING

BACKGROUND OF THE INVENTION

1. Field of the Invention

The invention relates to packaging films. More particularly, the invention pertains case ready packaging films having good antifog performance that are suitable for use in meat packaging.

2. Description of the Related Art

Containers have long been used to store perishable foods, such as meats, fruits and vegetables, prior to sale in the marketplace to consumers. Maximizing the time in which the food remains preserved in the containers minimizes the amount of spoilage.

The environment around which the food is preserved is an important factor in the preservation process. It is important that the food is maintained at an adequate temperature, while also controlling the molecular and chemical content of the gases surrounding the food. By providing an appropriate gas content to the environment surrounding the food, the food can be better preserved when maintained at the proper temperature or even when it is exposed to variations in temperature. This gives the food producer some assurance that the food will be in an acceptable condition when it reaches the consumer. Preferred modified atmosphere packaging systems for foods, including raw meats, exposes these foods to extremely low levels of oxygen because it is well known that the freshness of meat can be preserved longer under anaerobic conditions than under aerobic conditions. Maintaining low levels of oxygen minimizes the growth and multiplication of aerobic bacteria. Additionally, modified atmosphere packaging can involve high levels of oxygen, e.g. 80%, combined with nitrogen and/or carbon dioxide. The gases in these combinations do not favor bacterial growth but allow the raw meat to maintain a preferred red color that is acceptable to the consumer.

It is also important that the packaging exhibit good resistance to the formation of condensation inside the package on a surface of the film. This is known in the art as an antifog property. Multilayered films for modified atmosphere packaging having such antifog properties are well known and are commonly used when packaging food products having a high moisture content, such as fresh meats, and when it is important for the product to be clearly visible to the consumer. For example, U.S. Pat. Nos. 5,766,772, 5,567,533 and 5,520,764 describe multi-layer heat-shrinkable films endowed with antifog properties having a different structure from this invention.

To produce a film exhibiting this antifog property, an antifog component is typically blended with or coated onto a sealant film such as a polyethylene film. This antifog-polyethylene component then forms a part of a multilayered packaging film, such as a nylon packaging film, that may also incorporate an oxygen barrier polymer layer such as ethylene vinyl alcohol. However, one significant problem associated with such known multilayered films having this antifog component is that the antifog component tends to be drawn toward polar materials, such as nylon, and away from the non-polar polyethylene. This is particularly a problem when the film is rolled up after manufacture such that the antifog layer or antifog containing polyethylene layer is brought into direct contact with an adjacent nylon layer. This causes the antifog component to migrate out of its existing polyethylene layer and into the nylon layer, compromising the performance of the nylon layer as well as degrading the antifog property of the film. Therefore, it would be desirable to have a multilayered packaging film having good antifog performance and having an antifog component which does not migrate into adjacent nylon layers when stored. The present invention provides such a solution to this need.

SUMMARY OF THE INVENTION

The invention provides a multilayered film comprising an outer film attached to an inner film, wherein:

A) the outer film comprises:
 i. a first nylon layer having first and second surfaces;
 ii. an oxygen barrier layer having first and second surfaces, with its first surface attached to the second surface of the first nylon layer;
 iii. a second nylon layer having first and second surfaces, with its first surface attached to the second surface of the oxygen barrier layer; and B) the inner film comprises:
 i. a third nylon layer having first and second surfaces;
 ii. a silicone oil coated onto the first surface of or blended into the third nylon layer; and
 iii. a sealant film on the second surface of the third nylon layer, which sealant film either contains an antifog composition, or has an antifog composition coated on a surface thereof; and
 wherein the second nylon layer is laminated to the third nylon layer via an intermediate adhesive layer, such that the second surface of the second nylon layer and the first surface of the third nylon layer are facing each other.

The invention also comprises a multilayered film comprising an outer film attached to an inner film, wherein:

A) the outer film comprises:
 i. a first nylon 6 layer having first and second surfaces;
 ii. an ethylene vinyl alcohol layer having first and second surfaces, with its first surface attached to the second surface of the first nylon layer;
 iii. a second nylon 6 layer having first and second surfaces, with its first surface attached to the second surface of the ethylene vinyl alcohol layer; and B) the inner film comprises:
 i. a third nylon 6 layer having first and second surfaces;
 ii. a silicone oil coated onto the first surface of or blended into the third nylon 6 layer; and
 iii. a sealant film on the second surface of the third nylon 6 layer, which sealant film comprises at least one polyethylene layer, which the at least said one polyethylene layer either contains an antifog composition, or has an antifog composition coated on a surface thereof; and
 wherein the second nylon 6 layer is laminated to the third nylon 6 layer via an intermediate adhesive layer, such that the second surface of the second nylon 6 layer and the first surface of the third nylon 6 layer are facing each other.

In addition, this invention provides a food package which comprises a container having an open portion and a multilayered film sealing the open portion, wherein the multilayered film is as described above.

The invention further provides a process for forming a multilayered film comprising:

a) forming an outer film comprising a first nylon layer, an oxygen barrier layer and a second nylon layer, wherein the oxygen barrier layer is between the nylon layers;

b) forming an inner film which comprises a third nylon layer having first and second surfaces, a silicone oil coated on the first surface of or blended into the third nylon layer, and a sealant film on the second surface of the third nylon layer, which sealant film either contains an antifog composition, or has an antifog composition coated on a surface thereof; and c) laminating the outer film to the inner film via an intermediate adhesive layer, such that the second nylon layer and the first surface of the third nylon layer are facing each other.

This invention still further provides a process for forming a multilayered film comprising:

a) forming an outer film which comprises:
   i. a first nylon layer having first and second surfaces;
   ii. an ethylene vinyl alcohol layer having first and second surfaces, the first surface of the ethylene vinyl alcohol layer attached to the second surface of the first nylon layer; and
   iii. a second nylon layer attached to the second surface of the ethylene vinyl alcohol layer;

b) forming an inner film which comprises:
   i. forming a third nylon layer having first and second surfaces;
   iii. a second nylon layer attached to the second surface of the ethylene vinyl alcohol layer, b) forming an inner film which comprises:
   i. forming a third nylon layer having first and second surfaces;
   ii. coating a silicone oil onto the first surface of the third nylon layer;
   iii. attaching a sealant film onto the second surface of the third nylon layer, which sealant film comprises at least one polyethylene layer, which at least one polyethylene layer either contains an antifog composition, or has an antifog composition coated on a surface thereof; and c) attaching the second nylon layer to the third nylon layer such that the first surface of the third nylon layer faces the second nylon layer.

The invention therefore provides a desirable multilayered packaging film and a roll thereof having good physical properties, good antifog performance and having an antifog component which does not migrate into adjacent nylon layers when stored.

DETAILED DESCRIPTION OF THE PREFERRED EMBODIMENTS

The invention provides a multilayered packaging film having good antifog properties wherein the antifog composition does not migrate into adjacent polar film layers and an excellent oxygen barrier. In the production of a multilayered film according to the invention, an outer film, comprising an ethylene vinyl alcohol layer having a first nylon layer attached one surface and a second nylon layer attached to another surface, is laminated to an inner film, which inner film comprises a third nylon layer having first and second surfaces positioned on a surface of a sealant film, either directly on the surface of the third nylon layer or via an intermediate adhesive layer; on the other surface of the third nylon layer opposite the sealant film is a layer of a silicone oil. An antifog composition is contained within at least part of the sealant film or coated on a surface of the sealant film that is opposite to the third nylon layer, i.e. a surface different than the surface to which the third nylon layer is attached. The multilayered film of the invention exhibits good, permanent antifog properties and avoids migration of the antifog composition out of the sealant film.

Nylons are conventionally used in the art of multilayered packaging films. Suitable nylons within the scope of the invention non-exclusively include homopolymers or copolymers selected from aliphatic polyamides and aliphatic/aromatic polyamides having a molecular weight of from about 10,000 to about 100,000. General procedures useful for the preparation of polyamides are well known to the art. Such include the reaction products of diacids with diamines. Useful diacids for making polyamides include dicarboxylic acids which are represented by the general formula

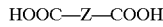

HOOC—Z—COOH wherein Z is representative of a divalent aliphatic radical containing at least 2 carbon atoms, such as adipic acid, sebacic acid, octadecanedioic acid, pimelic acid, suberic acid, azelaic acid, dodecanedioic acid, and glutaric acid. The dicarboxylic acids may be aliphatic acids, or aromatic acids such as isophthalic acid and terephthalic acid. Suitable diamines for making polyamides include those having the formula

$H_2N(CH_2)_nNH_2$ wherein n has an integer value of 1–16, and includes such compounds as trimethylenediamine, tetramethylenediamine, pentamethylenediamine, hexamethylenediamine, octamethylenediamine, decamethylenediamine, dodecamethylenediamine, hexadecamethylenediamine, aromatic diamines such as p-phenylenediamine, 4,4'-diaminodiphenyl ether, 4,4'-diaminodiphenyl sulfone, 4,4'-diaminodiphenylmethane, alkylated diamines such as 2,2-dimethylpentamethylenediamine, 2,2,4-trimethylhexamethylenediamine, and 2,4,4 trimethylpentamethylenediamine, as well as cycloaliphatic diamines, such as diaminodicyclohexylmethane, and other compounds. Other useful diamines include heptamethylenediamine, nonamethylenediamine, and the like.

Useful polyamide homopolymers include poly(4-aminobutyric acid) (nylon 4), poly(6-aminohexanoic acid) (nylon 6, also known as poly(caprolactam)), poly(7-aminoheptanoic acid) (nylon 7), poly(8-aminooctanoic acid) (nylon 8), poly(9-aminononanoic acid) (nylon 9), poly(10-aminodecanoic acid) (nylon 10), poly(1 1-aminoundecanoic acid) (nylon 11), poly(12-aminododecanoic acid) (nylon 12), nylon 4,6, poly(hexamethylene adipamide) (nylon 6,6), poly(hexamethylene sebacamide) (nylon 6,10), poly (heptamethylene pimelamide) (nylon 7,7), poly (octamethylene suberamide) (nylon 8,8), poly (hexamethylene azelamide) (nylon 6,9), poly (nonamethylene azelamide) (nylon 9,9), poly (decamethylene azelamide) (nylon 10,9), poly (tetramethylenediamine-co-oxalic acid) (nylon 4,2), the polyamide of n-dodecanedioic acid and hexamethylenediamine (nylon 6,12), the polyamide of dodecamethylenediamine and n-dodecanedioic acid (nylon 12,12) and the like. Useful aliphatic polyamide copolymers include caprolactam/hexamethylene adipamide copolymer (nylon 6/6,6), hexamethylene adipamide/caprolactam copolymer (nylon 6,6/6), trimethylene adipamide/hexamethylene azelaiamide copolymer (nylon trimethyl 6,2/6,2), hexamethylene adipamide-hexamethylene-azelaiamide captolactam copolymer (nylon 6,6/6,9/6) and the like. Also included are other nylons which are not particularly delineated here. Of these polyamides, preferred polyamides include nylon 6, nylon 6,6, nylon 6/6,6, nylon 6,6/6 as well as mixtures of the same. The most preferred polyamide is nylon 6.

Aliphatic polyamides used in the practice of this invention may be obtained from commercial sources or prepared in accordance with known preparatory techniques. For example, poly(caprolactam) can be obtained from Honeywell International Inc., Morristown, N.J. under the trademark CAPRON®.

Exemplary of aliphatic/aromatic polyamides include poly(tetramethylenediamine-co-isophthalic acid) (nylon 4,I), polyhexamethylene isophthalamide (nylon 6,I), hexamethylene adipamide/hexamethylene-isophthalamide (nylon 6,6/6I), hexamethylene adipamide/hexamethylene-terephthalamide (nylon 6,6/6T), poly (2,2,2-trimethyl hexamethylene terephthalamide), poly(m-xylylene adipamide) (MXD6), poly(p-xylylene adipamide), poly(hexamethylene terephthalamide), poly(dodecamethylene terephthalamide), polyamide 6T/6I, polyamide 6/MXDT/I, polyamide MXDI, and the like. Blends of two or more aliphatic/aromatic polyamides can also be used. Aliphatic/aromatic polyamides can be prepared by known preparative techniques or can be obtained from commercial sources. Other suitable polyamides are described in U.S. Pat. No. 4,826,955 and 5,541,267, which are incorporated herein by reference.

Positioned on a first surface of the inner film nylon layer is a silicone oil lubricant. This silicone oil may generally comprise any surface active lubricant which is preferably comprised of a polydimethylsiloxane material. The preferred silicone oils suitable for use in the present invention are food grade silicone oils. These are preferably a clear fluid, with a wide range of viscosities, ranging from about 0.65 cSt up to about 100,000 cSt., are essentially nontoxic and present a low environmental hazard. Additionally, these are very thermally stable materials that have low surface tension and a minimal viscosity variation of from about −40° C. to about 204° C. Silicone oils are also available in industrial and medical grades.

The food grade polydimethylsiloxane silicone oils are preferably 100% active silicone fluids that are inert, non-toxic and non-carbonizing. They generally have number average molecular weights ranging from about 7,500 to about 106,000. In the preferred embodiment of the invention, the food grade silicone oils used have viscosities ranging from about 50 cSt to about 1,000 cSt.

The silicone oil is present at an outer surface of the nylon layer. It has been found that when the multilayered film is produced and rolled up for storage, the silicone oil will prevent the antifog composition from migrating out of the sealant film and into an adjacent nylon layer. The silicone oil may be applied using techniques that are well known in the art. For example, silicone oil may be coated onto the outer surface of the nylon layer. Suitable coating methods include dip coating, meniscus coating, roller coating, doctor blade coating, and the like which are well known in the art. In an alternate method, the silicone oil component may be blended together with the nylon component to form a nylon blend, prior to forming the nylon into a layer, via well known extrusion techniques described in detail below. In this embodiment, once the nylon layer is formed from the blend, the silicone oil effectively blooms to the surface of the layer.

Positioned on a second surface of the third nylon layer is a high clarity, highly shrinkable, heat sealable sealant film. The sealant film is preferably a polyolefin, such as a polyethylene, polypropylene or other poly(alpha-olefin), and more preferably comprises a polyethylene. The sealant layer has an antifog composition that is either combined with the polymer of the sealant layer or coated on a surface of the sealant film opposite the nylon layer. Non-limiting examples of suitable polyethylenes are low density polyethylene (LDPE), linear low density polyethylene (LLDPE), linear medium density polyethylene (LMDPE), linear very-low density polyethylene (VLDPE), linear ultra-low density polyethylene (ULDPE), metallocene linear low density polyethylene (m-LLDPE), high density polyethylene (HDPE) and combinations thereof. Of these, the most preferred is a low density polyethylene, particularly linear low density polyethylene.

The antifog composition prevents condensation on the film when used to package products such as fresh meats, vegetables, etc. Non-limiting examples of antifog compositions are glycerol monoesters of a saturated or unsaturated fatty acid having from about 8 to about 20 carbon atoms, glycerol diesters of a saturated or unsaturated fatty acid having from about 8 to about 20 carbon atoms and ionic surfactants having phosphate, sulfate or quaternary amine functional end groups. Also suitable as antifog compositions are surfactants including anionic, cationic, nonionic and amphoteric surfactants. Suitable ionic surfactants have phosphate, sulfate or quaternary amine functional end groups. Other antifog compositions include sorbitan esters of aliphatic carboxylic acids, glycerol esters of aliphatic carboxylic acids, esters of other polyhydric alcohols with aliphatic carboxylic acids, polyoxyethylene compounds, such as the polyoxyethylene sorbitan esters of aliphatic carboxylic acids and polyoxyethylene ethers of higher aliphatic alcohols. Preferred antifog compositions are glycerol monooleate, glycerol monostearate, sorbitan esters and blends thereof. When the antifog composition is incorporated into the sealant film, it is blended into the polyethylene composition preferably in an amount of from about 0.1 weight percent to about 5 weight percent. When the antifog composition is coated on the sealant film it is preferably applied at a coating weight of from about 0.2 to about 1.0 g/m$^2$. Suitable antifog compositions are described, for example, in U.S. Pat. No. 5,766,772.

Attached to the inner film is an outer film. In the preferred embodiment of the invention, the outer film comprises a first nylon layer attached to a surface of an ethylene vinyl alcohol layer, and a second nylon layer attached to another surface of the ethylene vinyl alcohol layer. Each of the first and second nylon layers of the outer film may be the same or different and may comprise any of the polyamide materials described above which are suitable for the inner film.

Ethylene vinyl alcohol compounds are well known in the art and readily commercially available. Copolymers of ethylene and vinyl alcohol suitable for use in the present invention can be prepared, for example, by the methods disclosed in U.S. Pat. Nos. 3,510,464; 3,560,461; 3,847,845; 3,595,740 and 3,585,177. The ethylene vinyl alcohol copolymer can be a hydrolyzed ethylene vinyl acetate copolymer. The degree of hydrolysis can range from about 85% to about 99.5%. The ethylene vinyl alcohol copolymer preferably contains from about 15 to about 65 mol percent ethylene and more preferably about 25 to about 50 mol percent ethylene. Copolymers of lower than 15 mol percent ethylene tend to be difficult to extrude while those above 65 mol percent ethylene have reduced oxygen barrier performance. The term "ethylene/vinyl alcohol copolymer" or "EVOH" is intended to comprise also the hydrolyzed or saponified ethylene/vinyl acetate copolymers and refers to a vinyl alcohol copolymer having an ethylene comonomer, which may be obtained, for example, by the hydrolysis of an ethylene/vinyl acetate copolymer or by chemical reaction of ethylene monomers with vinyl alcohol.

The inner and outer films are preferably attached together via an intermediate adhesive layer. Suitable adhesive materials include polyurethanes, epoxies, polyesters, acrylics, anhydride modified polyolefin and blends thereof. Modified polyolefin compositions have at least one functional moiety preferably selected from the group consisting of unsaturated poly carboxylic acids and anhydrides thereof. Such unsaturated carboxylic acid and anhydrides include maleic acid and anhydride, fumaric acid and anhydride, crotonic acid and anhydride, citraconic acid and anhydride, itaconic acid and anhydride the like. The adhesive layer may also optionally comprise a colorant, an ultraviolet light absorber or both. The adhesive layer may be applied directly onto either of the adjacent layers by any appropriate means in the art, such as by coating. Suitable coating techniques are described above. In the preferred embodiment of the invention, the individual layers of the inner film are preferably attached via an intermediate adhesive layer which may also comprise these materials described herein.

Each of the nylon layers, ethylene vinyl alcohol, polyolefin or adhesive layers may optionally also include one or more conventional additives whose uses are well known to those skilled in the art. The use of such additives may be desirable in enhancing the processing of the compositions as well as improving the products or articles formed therefrom. Examples of such include: oxidative and thermal stabilizers, lubricants, release agents, flame-retarding agents, oxidation inhibitors, oxidation scavengers, dyes, pigments and other coloring agents, ultraviolet light absorbers and stabilizers, organic or inorganic fillers including particulate and fibrous fillers, nanoclays (clays containing nanosize particles), treated nanoclays, reinforcing agents, nucleators, plasticizers, as well as other conventional additives known to the art. Such may be used in any suitable amount, such as, for example, up to about 10% by weight (or more) of the overall composition. Representative ultraviolet light stabilizers include various substituted resorcinols, salicylates, benzotriazole, benzophenones, and the like. Suitable lubricants and release agents include stearic acid, stearyl alcohol, and stearamides. Exemplary flame-retardants include organic halogenated compounds, including decabromodiphenyl ether and the like as well as inorganic compounds. Suitable coloring agents including dyes and pigments include cadmium sulfide, cadmium selenide, titanium dioxide, phthalocyanines, ultramarine blue, nigrosine, carbon black and the like. Representative oxidative and thermal stabilizers include the Period Table of Element's Group I metal halides, such as sodium halides, potassium halides, lithium halides; as well as cuprous halides; and further, chlorides, bromides, iodides. Also, hindered phenols, hydroquinones, aromatic amines as well as substituted members of those above mentioned groups and combinations thereof. Exemplary plasticizers include lactams such as caprolactam and lauryl lactam, sulfonamides such as o,p-toluenesulfonamide and N-ethyl, N-butyl benzylnesulfonamide, and combinations of any of the above, as well as other plasticizers known to the art.

Each of the layers may be joined together by coextrusion. In the coextrusion process, for example, the polymeric material for the individual layers are fed into infeed hoppers of a like number of extruders, each extruder handling the material for one or more of the layers. In the preferred embodiment of the invention, this technique is used to form a blend of the nylon material and the silicone oil. Preferably, the silicone oil is added to the melted nylon at about 100 ppm to about 200 ppm, more preferably from about 125 ppm to about 175 ppm, and most preferably from about 140 ppm to about 160 ppm. The melted and plasticated streams from the individual extruders are fed into a single manifold co-extrusion die. While in the die, the layers are juxtaposed and combined, then emerge from the die as a single multiple layer film of polymeric material. After exiting the die, the film is cast onto a first controlled temperature casting roll, passes around the first roll, and then onto a second controlled temperature roll, which is normally cooler than the first roll. The controlled temperature rolls largely control the rate of cooling of the film after it exits the die. Additional rolls may be employed. In another method, the film forming apparatus may be one which is referred to in the art as a blown film apparatus and includes a multi-manifold circular die head for bubble blown film through which the plasticized film composition is forced and formed into a film bubble which may ultimately be collapsed and formed into a film. Processes of coextrusion to form film and sheet laminates are generally known. Typical coextrusion techniques are described in U.S. Pat. Nos. 5,139,878 and 4,677,017.

Alternately the individual films may first be formed as separate layers and then laminated together under heat and pressure with or without intermediate adhesive layers. Lamination techniques are well known in the art. Typically, laminating is done by positioning the individual layers on one another under conditions of sufficient heat and pressure to cause the layers to combine into a unitary film. Typically the inner film nylon layer and the antifog composition containing sealant film will be positioned on one another such that each of the antifog composition layer and the silicone oil layer are facing outward, and the combination is passed through the nip of a pair of heated laminating rollers by techniques well known in the art. Lamination heating may be done at temperatures ranging from about 120° C. to about 175° C., preferably from about 150° C. to about 175° C., at pressures ranging from about 5 psig (0.034 MPa) to about 100 psig (0.69 MPa), for from about 5 seconds to about 5 minutes, preferably from about 30 seconds to about 1 minute.

In the preferred embodiment of the invention, the layers of the outer film are coextruded, while the sealant film and the nylon layer of the inner film are preferably attached by lamination via an intermediate adhesive layer. Additionally, the outer film and inner film are preferably attached by lamination via an intermediate adhesive layer. In the preferred embodiment of the invention, lamination of the outer film to the inner film is preferably conducted at room temperature, or at another temperature that will not cause substantial shrinkage of either the inner or outer films or their component layers.

In the preferred embodiment of the invention, the outer film layers are either monoaxially or biaxially oriented prior to being attached to the inner film, preferably being biaxially oriented. The inner film and its individual layers are preferably unoriented, however the nylon layer of the inner film also may be either monoaxially or biaxially oriented. For the purposes of the present invention the term draw ratio is an indication of the increase in the dimension in the direction of draw. Preferably, in the present invention the outer film is drawn to a draw ratio of from 1.5:1 to 5:1 uniaxially in at least one direction, i.e. its longitudinal direction, its transverse direction or biaxially in each of its longitudinal and transverse directions. Preferably, the outer film is simultaneously biaxially oriented, for example orienting a plasticized film in both the machine and transverse directions at the same. This results in dramatic improvements in clarity strength and toughness properties.

Preferably, the outer film is biaxially oriented and is not heat set so that it is shrinkable both in its transverse and longitudinal directions. Alternately, the nylon layers may be unoriented cast nylon. It is also within the scope of the invention that the individual nylon layers of either the inner or outer films be subjected to a corona treatment in order to improve the adhesion to other layers. A corona treatment is a process in by which a layer of material is passed through a corona discharge station giving the surface of the layer a charge that improves its ability to bond to an adjacent layer. However, this step is not required. If conducted, it is preferably done immediately after extrusion of the layer or film.

Although each layer of the multilayer film structure may have a different thickness, the thickness of each of the nylon layers is preferably from about 1 $\mu$m to about 25 $\mu$m, more preferably from about 3 $\mu$m to about 8 $\mu$m, and most preferably from about 4 $\mu$m to about 6 $\mu$m. The thickness of the silicone oil layer is preferably from about 1 $\mu$m to about 25 $\mu$m, more preferably from about 2 $\mu$m to about 8 $\mu$m and most preferably from about 3 $\mu$m to about 5 $\mu$m. The thickness of the sealant film is preferably from about 1 $\mu$m to about 50 $\mu$m, more preferably from about 10 $\mu$m to about 30 $\mu$m, and most preferably from about 12 $\mu$m to about 25

μm. If a multicomponent sealant film is included rather than an individual antifog containing polyethylene layer, the thickness of that multicomponent sealant film is preferably within this range. The overall thickness of each of the outer film and inner film is preferably from about 1 μm to about 50 μm, more preferably from about 10 μm to about 30 μm, and most preferably from about 12 μm to about 25 μm. While such thicknesses are preferred, it is to be understood that other film thicknesses may be produced to satisfy a particular need and yet fall within the scope of the present invention.

The oxygen transmission rate (OTR) of the multilayered film of the invention may be determined via the procedure of ASTM D-3985. In the preferred embodiment, the multilayered film according to this invention has an OTR of about 0.1 cc/100 in$^2$/day or less (1.6 cc/100 m$^2$/day or less), preferably from about 0.05 cc/100 in$^2$/day or less (0.8 cc/100 m$^2$/day or less) at 65% relative humidity at 20° C.

The multilayered film of the invention is preferably heat shrinkable, generally by an amount of from about 2% to about 30%, more preferably from about 10% to about 20% in its length, or its width or each of its length and width. To provide a tightly adhering lid for a tray, for example, the film only need to exhibit shrinkage on the order of about 2 to about 3%. However, in order to have the film also form (unrestrained) about the side of the tray, higher shrinkage in the film is desirable.

The multilayered film may further have printed indicia on at least one of the nylon layers. Since such printing is on an internal surface of the structure, it will not rub off when the surface is contacted. Optionally, the multilayered film may be uniaxially or biaxially oriented in a manner and in an amount indicated above and is not heat set so that it is shrinkable both in its transverse and longitudinal directions. In this case, other individual layers may or may not have been oriented already.

The multilayered film preferably has a puncture resistance of at least about 10 lbs. (4500 g) force as measured by ASTM F 1306, and preferably higher than 10 lbs. force. Preferably the film has a haze of about 4% or less and a clarity of about 92% or higher as measured by ASTM D1003.

The multilayered film may be formed as a web and stored as a roll. It has been found that the unique structure of this inventive film is particularly effective in preventing the migration of the antifog material from the polyethylene of the sealant film to an adjacent nylon layer when in roll form. More particularly, it has been unexpectedly found that the use of a silicone oil lubricant effectively blocks the migration of the antifog. Therefore, the invention is useful for a wide variety of structures formed with a wide variety of materials, in order to insure excellent antifog performance.

The multilayered film is useful for forming a food package including a container, such as a tray, having an open portion and the multilayered film sealing the open portion. Such a structure is generally referred to a lidding or packaging film. Such containers are suitable for packaging a variety of raw meats such as beef, pork, poultry, and veal, among others. A packaged food may comprises the food package and a food product such as a meat in the food package.

The container may have enclosed side walls, a floor and an top opening defining a central cavity wherein the open top optionally has a substantially flat peripheral rim. The multilayered film surrounds the container and is heat shrunk and heat sealed to it such that the antifog composition is on the open portion (facing inward) and the outer film is facing away from the open portion of the container. The container may comprise a material such as cardboard, paperboard, boardstock, a plastic and combinations thereof Preferred plastics include any one of several thermosetting or thermoplastic resins any of which are capable of sealing to the lidding material. Examples of materials include acrylonitrile, an acrylic polymer, polyethylene terephthalate (PET) or copolymers thereof, polyvinyl chloride, polycarbonate, polystyrene and polypropylene. In use the multilayered film is positioned around the open portion and is caused to shrink, e.g. by the application of heat, by a sufficient amount to seal the open portion of the container.

It is also within the intended scope of the invention that any of the individual nylon layers of the invention, in addition to the nylon layer of the inner film, may have a silicone oil on a surface thereof. The silicone oil is preferably the same oil as is present on a surface of the inner nylon layer, and may be coated onto a surface of the nylon layers or blended with the nylon prior to extrusion. For example, in one preferred embodiment of the invention, the multilayered film comprises an inner film which is a nylon 6/6,6 film having a silicone oil on its surface, this nylon 6/6,6 film is then attached to a sealant film structure comprising an antifog containing polyethylene layer attached to the nylon 6/6,6 layer via an intermediate adhesive tie layer. This structure is then laminated to an outer film coextrusion of a first nylon 6 layer having a silicone oil on a surface thereof, an ethylene vinyl alcohol layer attached to a surface of the first nylon layer without oil and a second nylon 6 layer having a silicone oil on a surface thereof attached to a surface of the ethylene vinyl alcohol layer opposite the first nylon layer such that the silicone oil is on a surface that is not in contact with the ethylene vinyl alcohol layer. The invention, however, is not limited solely to the particular embodiments that are disclosed.

The following non-limiting examples serve to illustrate the invention.

EXAMPLE 1 (COMPARATIVE)

A sealant film web was made by cast coextrusion. A three polymer/three layer structure was made with a total thickness of 1 mil (25.4 μm). This film comprised 0.7 mil (17.8 μm) of a linear low density polyethylene containing 25% of an antifog masterbatch (5% active antifog agent); 0.1 mil (2.5 μm) of an anhydride modified polyethylene tie adhesive; and 0.2 mil (5.0 μm) of a 100 formic acid viscosity (FAV) nylon 6 containing a low viscosity silicone oil (150 ppm). The nylon side of the film was corona treated to a surface energy >60 dyne-cm. This film was rolled such that the nylon layer (with silicone oil) was in contact with the antifog containing polyethylene layer.

Physical data for this coextruded sealant film are:

| Mechanical Data: | Machine Direction | Transverse Direction | Test Method |
| --- | --- | --- | --- |
| Tensile Modulus (MPa) | 290 | 325 | ASTM D882 |
| Tensile Yield (MPa) | 38 | 37 | ASTM D882 |
| Tensile Elongation (%) | 7.517 | 7.513 | ASTM D882 |
| Tensile Strength (MPa) | 100 | 109 | ASTM D882 |
| Elongation (%): | 350 | 400 | ASTM D882 |
| Elmendorf Tear (g/layer): | 50 | 75 | ASTM D1922 |
| Graves Tear (g/25.4 μm): | 10.8 | 9.8 | ASTM D1004 |

Antifog performance was measured on the above film as follows. After a given number of days in a roll, the coextruded polyethylene sealant film was removed and sealed to a 5"×7" (127 mm v. 178 mm) polyethylene tray containing a pad of tissue paper soaked with 30 mL of water. The tray was placed inside a refrigerator (4° C.) and the extent of condensation buildup on the film surface was noted after a set period of time (5 hours). The degree of condensation and antifog performance rating is described in Table 1. A score of above 8 is acceptable. The results comparing the example coextruded film without and with the silicone oil additive in the nylon fraction are described in Table 2.

TABLE 1

| Grade | Antifog Performance |
|---|---|
| 0 | Fine fog across entire surface. Difficult to view product |
| 2 | Small droplets (1–2 mm). Product somewhat obscured. |
| 4 | Medium droplets (2–4 mm). |
| 6 | Large drops (>4 mm). |
| 8 | Moisture visible but fairly uniform w/some texture or large drops. |
| 10 | Indistinguishable from dry film over entire package. |

TABLE 2

| Material | In Roll form for 0 days | In Roll for 2 days | In Roll for 4 days | In Roll for 6 days |
|---|---|---|---|---|
| Without Silicone Oil | 8 | 6 | 5 | 4 |
| With Silicone Oil | 8 | 7 | 9 | 9 |

EXAMPLE 2

The sealant web film from Example 1 was dry laminated to a coextruded biaxially oriented high shrink nylon 6/EVOH/nylon 6 barrier film. The adhesive, a two part polyurethane material, was applied at or near 0.5 lb/ream (230 g/ream) to one surface of the shrink barrier film, dried in a conventional forced air oven and the two films laminated together at room temperature, with one nylon 6 layer of the sealant web attached to the adhesive coated surface of then shrink barrier film. The adhesive used works whether the shrink barrier film is printed (on the laminated side) or not.

Bond strength testing of the bond between the sealant film and the biaxially oriented barrier shrink film results in the destruction of the sealant film. The bond strength is higher than the strength of the weakest component film.

Film properties:

| | |
|---|---|
| Thickness (μm) | 40.1 to 45.7 |
| Puncture (g)¼" (6 mm) Probe | 8720 +/− 725 |
| Light Transmission (%) | 93.1 +/− 0.05 |
| Haze Level | 3.11 +/− 0.37 |
| Clarity | 95.8 +/− 0.25 |

The oxygen transmission rate (ASTM D1434) is 1.2 cc/m²/day at 65% RH and 23° C. and <0.3 cc/m²/day at 80% RH and 4° C. This makes the film suitable for refrigerated meat storage using high oxygen percentage modified atmospheres.

Physical properties are:

| Mechanical Data: | Machine Direction | Transverse Direction | Test Method |
|---|---|---|---|
| Tensile Modulus (MPa) | 975 | 940 | ASTM D882 |
| Tensile Yield (MPa) | 30 | 31 | ASTM D882 |
| Tensile Elongation (%) | 7.517 | 7.513 | ASTM D882 |
| Tensile Strength (MPa) | 100 | 109 | ASTM D882 |
| Elongation (%) | 105 | 97 | ASTM D882 |

-continued

| Mechanical Data: | Machine Direction | Transverse Direction | Test Method |
|---|---|---|---|
| Elmendorf Tear (g/layer) | 52 | 24 | ASTM D1922 |
| Graves Tear (g/25.4 μm) | 15.9 | 19.1 | ASTM D1004 |

Dimensional stability is controlled by the high shrink barrier film. Measured at 22% shrink in the machine direction and 18% shrink in the transverse direction the film is ultimately suitable for heat sealing as a lid to a tray such that the shrinkage causes the film to draw tight and flat. Dimensional stability is measured at 350° F. (175° C.) for 10 min. according to ASTM D1204.

EXAMPLE 3

The laminate of Example 2 was tested for antifog performance as described above. After storage in roll form, the material was tested and the results are described in Table 3.

TABLE 3

| In Roll form for 0 days | In Roll for 2 days | In Roll for 4 days | In Roll for 6 days |
|---|---|---|---|
| 9 | 6 | 8 | 9 |

The examples show the enhanced physical properties of the multilayered film produced according to the invention.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A multilayered film comprising an outer film attached to an inner film, wherein:
  A) said outer film comprises:
    i. a first nylon layer having first and second surfaces;
    ii. an oxygen barrier layer having first and second surfaces, with its first surface attached to said second surface of said first nylon layer;
    iii. a second nylon layer having first and second surfaces, with its first surface attached to said second surface of said oxygen barrier layer; and
  B) said inner film comprises:
    i. a third nylon layer having first and second surfaces;
    ii. a silicone oil coated onto said first surface of or blended into said third nylon layer; and
    iii. a sealant film on said second surface of said third nylon layer, which sealant film either contains an antifog composition, or has an antifog composition coated on a surface thereof; and
  wherein said second nylon layer is laminated to said third nylon layer via an intermediate adhesive layer, such that said second surface of said second nylon layer and said first surface of said third nylon layer are facing each other.

2. The multilayered film of claim 1 wherein said sealant film comprises at least one polyolefin layer.

3. The multilayered film of claim 1 wherein said sealant film comprises at least one polyethylene layer.

4. The multilayered film of claim 1 wherein the antifog composition is contained within said sealant layer.

5. The multilayered film of claim 1 wherein said antifog composition is coated on a surface of said sealant layer.

6. The multilayered film of claim 1 wherein said nylon layers each independently comprise nylon 6, nylon 66, nylon 6/6,6, nylon 6,6/6 or combinations thereof.

7. The multilayered film of claim 1 wherein said nylon layers comprise nylon 6.

8. The multilayered film of claim 1 wherein said silicone oil comprises a surface active lubricant.

9. The multilayered film of claim 1 wherein said silicone oil comprises a polydimethylsiloxane material.

10. The multilayered film of claim 1 wherein said sealant film comprises a polyethylene layer selected from the group consisting of ultra low density polyethylene, low density polyethylene, linear low density polyethylene, metallocene linear low density polyethylene, medium density polyethylene, high density polyethylene and combinations thereof.

11. The multilayered film of claim 1 wherein said sealant film comprises a linear low density polyethylene.

12. The multilayered film of claim 1 wherein said intermediate adhesive layer is selected from the group consisting of polyurethanes, epoxies, polyesters, acrylics, anhydride modified polyolefins and combinations thereof.

13. The multilayered film of claim 1 wherein said sealant film and said third nylon layer are laminated together via a second adhesive layer.

14. The multilayered film of claim 13 wherein said second adhesive layer is selected from the group consisting of polyurethanes, epoxies, polyesters, acrylics, anhydride modified polyolefins and combinations thereof.

15. The multilayered film of claim 1 wherein said oxygen barrier layer comprises an ethylene vinyl alcohol polymer.

16. The multilayered film of claim 15 wherein said first nylon layer, said oxygen barrier layer and said second nylon layer are coextruded.

17. The multilayered film of claim 15 wherein said antifog composition comprises one or more materials selected from the group consisting of glycerol monoesters of a saturated or unsaturated fatty acid having from about 8 to about 20 carbon atoms, glycerol diesters of a saturated or unsaturated fatty acid having from about 8 to about 20 carbon atoms; ionic surfactants having phosphate, sulfate or quaternary amine functional end groups; and sorbitan esters.

18. The multilayered film of claim 1 wherein said first nylon layer, said oxygen barrier layer and said second nylon layer are coextruded.

19. The multilayered film of claim 1 wherein said antifog composition comprises one or more materials selected from the group consisting of glycerol monoesters of a saturated or unsaturated fatty acid having from about 8 to about 20 carbon atoms, glycerol diesters of a saturated or unsaturated fatty acid having from about 8 to about 20 carbon atoms; ionic surfactants having phosphate, sulfate or quaternary amine functional end groups; and sorbitan esters.

20. The multilayered film of claim 1 wherein said outer film is uniaxially oriented, biaxially oriented or a blown film.

21. The multilayered film of claim 1 wherein said outer film is biaxially oriented.

22. The multilayered film of claim 1 wherein said inner film is unoriented.

23. The multilayered film of claim 1 wherein said outer and inner films are heat shrinkable.

24. The multilayered film of claim 1 further comprising printed indicia on at least one nylon layer.

25. The multilayered film of claim 1 which has an oxygen transmission rate of less than about 1.6 cc/100 m$^2$/day at 65% relative humidity at 20° C.

26. The multilayered film of claim 1 wherein at least one of said first, second or third nylon layers is corona treated.

27. A multilayered film comprising an outer film attached to an inner film, wherein:
A) said outer film comprises:
   i. a first nylon 6 layer having first and second surfaces;
   ii. an ethylene vinyl alcohol layer having first and second surfaces, with its first surface attached to said second surface of said first nylon layer;
   iii. a second nylon 6 layer having first and second surfaces, with its first surface attached to said second surface of said ethylene vinyl alcohol layer; and
B) said inner film comprises:
   i. a third nylon 6 layer having first and second surfaces;
   ii. a silicone oil coated onto said first surface of or blended into said third nylon 6 layer; and
   iii. a sealant film on said second surface of said third nylon 6 layer, which sealant film comprises at least one polyethylene layer, which said at least said one polyethylene layer either contains an antifog composition, or has an antifog composition coated on a surface thereof; and
wherein said second nylon 6 layer is laminated to said third nylon 6 layer via an intermediate adhesive layer, such that said second surface of said second nylon 6 layer and said first surface of said third nylon 6 layer are facing each other.

28. The multilayered film of claim 27 wherein said outer film is a coextruded biaxially oriented film.

29. The multilayered film of claim 29 wherein said inner film is heat shrinkable.

30. A food package which comprises a container having an open portion and a multilayered film sealing the open portion, which multilayered film comprises the film of claim 1.

31. A packaged food which comprises the food package of claim 30 and a food product in the food package.

32. The packaged food of claim 31 wherein said food product comprises a meat.

33. A food package which comprises a container having an open portion and a multilayered film sealing the open portion, which multilayered film comprises the film of claim 27.

34. The multilayered film of claim 1 in roll form.

35. A process for forming a multilayered film comprising:
a) forming an outer film comprising a first nylon layer, an oxygen barrier layer and a second nylon layer, wherein said oxygen barrier layer is between said nylon layers;
b) forming an inner film which comprises a third nylon layer having first and second surfaces, a silicone oil coated on said first surface of or blended into said third nylon layer, and a sealant film on said second surface of said third nylon layer, which said sealant film either contains an antifog composition, or has an antifog composition coated on a surface thereof; and
c) laminating said outer film to said inner film via an intermediate adhesive layer, such that said second nylon layer and said first surface of said third nylon layer are facing each other.

36. The process of claim 35 wherein said nylon layers independently comprise nylon 6, nylon 66, nylon 6/6,6 or combinations thereof.

37. The process of claim 35 further comprising corona treating at least one of said first, second or third nylon layers.

38. The process of claim 35 wherein said sealant film comprises a polyethylene layer selected from the group consisting of ultra low density polyethylene, low density polyethylene, linear low density polyethylene, metallocene linear low density polyethylene, medium density polyethylene and high density polyethylene.

39. The process of claim 35 comprising blending said antifog composition within said sealant film.

40. The process of claim 35 comprising coating said antifog composition on a surface of said sealant film.

41. The process of claim 35 comprising laminating together said sealant film and said third nylon layer via a second adhesive layer.

42. The process of claim 35 wherein said antifog composition comprises one or more materials selected from the group consisting of glycerol monoesters of a saturated or unsaturated fatty acid having from about 8 to about 20 carbon atoms, glycerol diesters of a saturated or unsaturated fatty acid having from about 8 to about 20 carbon atoms; ionic surfactants having phosphate, sulfate or quaternary amine functional end groups; and sorbitan esters.

43. The process of claim 35 wherein said outer film is formed by coextrusion.

44. The process of claim 35 wherein said outer film is either uniaxially oriented or biaxially oriented, or a blown film.

45. The process of claim 35 wherein the outer film is biaxially oriented.

46. The process of claim 35 wherein the inner film is unoriented.

47. The process of claim 35 further comprising printing indicia on at least one of the nylon layers.

48. The process of claim 35 wherein said silicone oil comprises a surface active lubricant.

49. The process of claim 35 wherein said silicone oil comprises a polydimethylsiloxane material.

50. The process of claim 35 wherein said intermediate adhesive layer is selected from the group consisting of polyurethanes, epoxies, polyesters, acrylics, anhydride modified polyolefins and combinations thereof.

51. A process for forming a multilayered film comprising:
  a) forming an outer film which comprises:
    i. a first nylon layer having first and second surfaces;
    ii. an ethylene vinyl alcohol layer having first and second surfaces, said first surface of said ethylene vinyl alcohol layer attached to said second surface of said first nylon layer; and
    iii. a second nylon layer attached to said second surface of said ethylene vinyl alcohol layer;
  b) forming an inner film which comprises:
    i. forming a third nylon layer having first and second surfaces;
    ii. coating a silicone oil onto said first surface of said third nylon layer;
    iii. attaching a sealant film onto said second surface of said third nylon layer, which sealant film comprises at least one polyethylene layer, which at least one polyethylene layer either contains an antifog composition, or has an antifog composition coated on a surface thereof; and
  c) attaching said second nylon layer to said third nylon layer such that said first surface of said third nylon layer faces said second nylon layer.

52. The process of claim 51 wherein said second nylon layer is attached to said third nylon layer by lamination via an intermediate adhesive layer.

53. The process of claim 51 wherein said outer film is formed by coextrusion and is biaxially oriented.

* * * * *